April 10, 1956 P. A. NOXON ET AL 2,741,733
POSITIONING SYSTEM MONITOR
Filed April 29, 1950
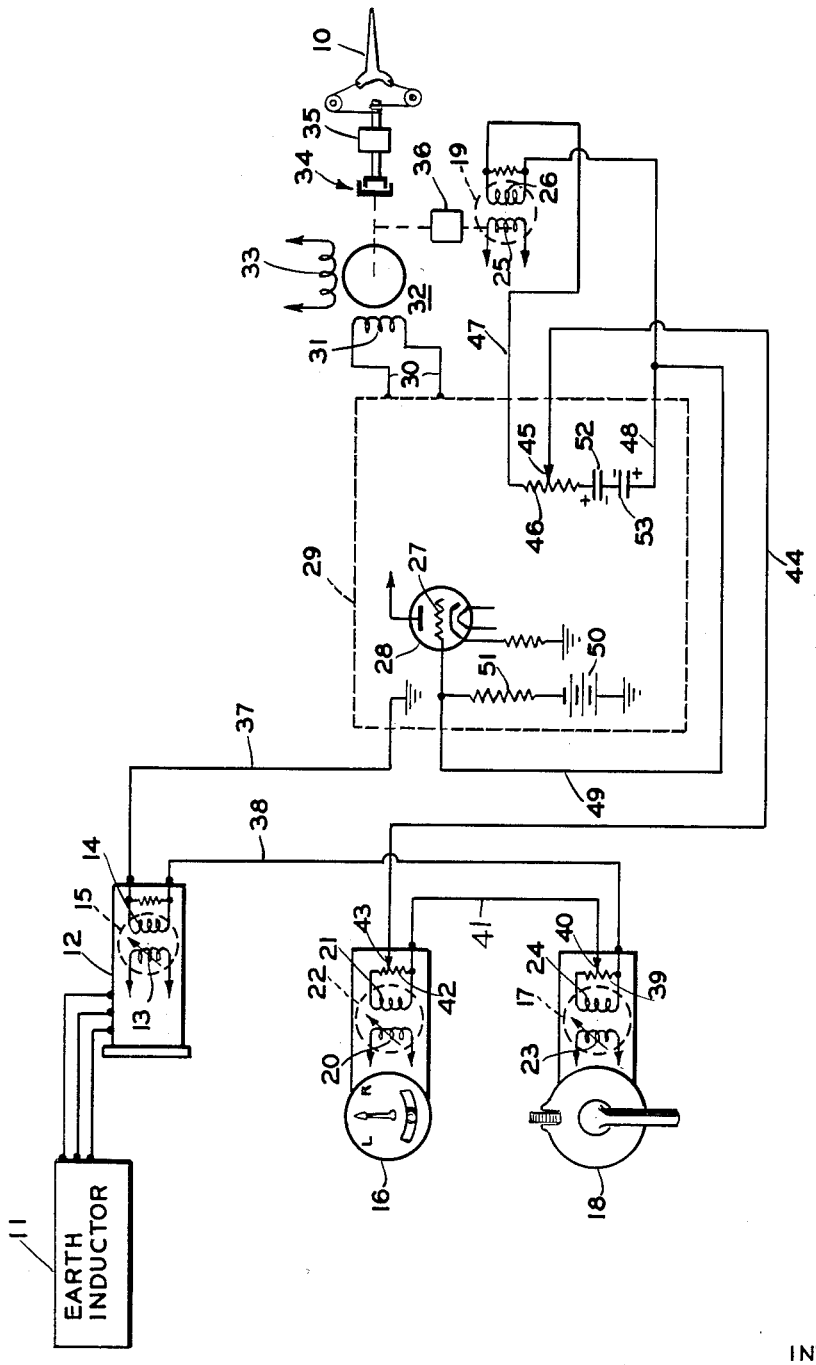
INVENTORS
PAUL A. NOXON
ALAN M. MAC CALLUM
ATTORNEY United States Patent Office 2,741,733
Patented Apr. 10, 1956

2,741,733

POSITIONING SYSTEM MONITOR

Paul A. Noxon, Tenafly, and Alan M. MacCallum, Maywood, N. J., assignors to Bendix Aviation Corporation, Teterboro, N. J., a corporation of Delaware Application April 29, 1950, Serial No. 159,016

11 Claims. (Cl. 318—489)

The present invention relates generally to safety or monitoring arrangements for positioning systems and more particularly to apparatus of this general character adapted for preventing improper control of an aircraft by an automatic pilot system due to opens or grounds developed in the rudder, aileron or elevator signal chains.

Automatic pilot systems for aircraft currently in use generally comprise a three channel control arrangement, each channel, in turn, generally consisting of a displacement and trim signal generator for controlling a surface servo motor through an amplifier together with an electric follow-up signal generator for modifying the operation of the motor. Heretofore, the signal chains of each channel were so arranged that the displacement signal generator fed directly into the amplifier, the trim signal generator was connected with the displacement signal generator and the follow-up signal generator was at the end of the chain having one end grounded and the other connected to the trim signal generator. With the latter arrangement, a ground occurring in the signal chain between the follow-up signal generator and the amplifier input resulted in loss of follow-up. Since these systems are closed loop systems, loss of follow-up will cause the control surface to be operated in such a manner as to cause the craft to oscillate undesirably about a predetermined flight position.

Moreover, with previous automatic pilot systems, a sensitivity control potentiometer for the follow-up signal was arranged within the amplifier which was mounted a considerable distance from the follow-up signal generator so that in the event of an open lead between the follow-up signal generator and its adjustment potentiometer, whereby follow-up was lost, the amplifier would not be blocked as intended to prevent improper surface operation.

The present invention contemplates a novel arrangement of the signal chains so that the follow-up signal is fed directly into the amplifier input with the desirable result that while grounds may occur along the signal chain follow-up will still be available to prevent control surface oscillation. In addition to the foregoing, condenser means are associated in a novel manner with the follow-up signal potentiometer whereby in the event of an open between the potentiometer and the follow-up signal generator the amplifier is automatically blocked to prevent improper surface operation.

An object of the present invention, therefore, is to provide a novel safety arrangement for monitoring the operation of a positioning system.

Another object of the invention is to provide a novel monitoring system for an aircraft automatic pilot whereby improper surface control by the automatic pilot due to grounds or open leads occurring in the signal chains is prevented.

The foregoing and other objects and advantages of the invention will appear more fully hereinafter from a consideration of the detailed description which follows when taken together with the accompanying drawing wherein one embodiment of the invention is illustrated. It is to be expressly understood, however, that the drawing is for the purpose of illustration and description only and is not designed as a definition of the limits of the invention.

The single figure of the drawing is a diagrammatic illustration of one embodiment of the novel safety arrangement of the present invention as applied to the rudder channel of an aircraft automatic pilot.

Referring now to the single figure of the drawing for a more detailed description of the novel safety arrangement of the present invention, the latter is shown as applied to the rudder channel of a conventional aircraft automatic pilot. It is to be understood, however, that the same novel provision is incorporated in the aileron and elevator channels so that their operation is similar to the operation set forth hereinbelow in connection with the rudder channel. As illustrated in the single figure of the drawing, the rudder channel of the automatic pilot generally comprises for the control of a rudder surface 10, a compass consisting of a stabilized earth inductor element 11 and a master direction indicator device 12 which receives the signals of element 11 and in response thereto actuates a movable wound rotor 13 relative to a fixed wound stator 14 of an inducitve transmitter device 15 to develop in the stator signals for control of rudder 10.

In addition to the compass signal for rudder control other signals such as rate of turn, course turn and follow-up signals are developed by a rate of turn device 16, a turn signal generator 17, incorporated in a manual turn control unit 18 and an inductive follow-up device 19. The rate of turn device actuates a movable wound rotor 20 relative to a fixed wound stator 21 of an inductive turn rate signal developing device 22 while signal generator 17 consists of a movable wound rotor 23 and an inductively coupled and fixed wound stator 24. Similarly, follow-up device 19 consists of a movable wound rotor 25 and an inductively coupled and fixed wound stator 26, all of the rotors being energized by a suitable source of single phase alternating current (not shown) whereby in response to movement of the rotors relative to their stators, signals will be developed in the latter of varying phase and magnitude.

Heretofore it has been the practice to arrange all of the signal generators in a series signal chain with the inductive follow-up device 19 at the end of the chain with one end grounded and the inductive compass signal transmitter 15 leading the chain and connected with the grid 27 of a tube 28 at the input stage of a rudder channel amplifier 29. The output of the amplifier is fed by way of leads 30 to the variable phase winding 31 of a two-phase induction motor 32 whose second phase winding 33 is connected with a suitable source of current. Motor 32 drivably connects through an electromagnetic clutch 34 and a gear reduction mechanism 35 with the rudder surface and through a gear reduction mechanism 36 with wound rotor 25 of follow-up device 19. The overall operation of such a system for maintaining an aircraft automatically in a predetermined position is well known in the art and need not be here described.

With the foregoing arrangement, however, i. e., with the compass signal transmitter connected directly to the amplifier input and leading the signal chain and the follow-up signal generator being grounded and located at the end of the chain, it has been found that resulting from worn or defective wiring grounds may occur along the signal chain ahead of follow-up device 19 whereby the signal of the latter is the first to be lost with the result that undesirable craft oscillations about the predetermined position will occur.

In accordance with one of the objects of the novel arrangement of the present invention, the foregoing disadvantage has been overcome by arranging the signal chain in such a manner that the follow-up device leads the signal chain and feeds directly to the amplifier input whereby follow-up signal is retained in spite of grounds that may occur along the signal chain. To this end, therefore, stator 14 of the compass signal transmitter 15 has one end grounded in the amplifier by way of a lead 37 and its other end connected by way of a lead 38 with one end of stator 24 of turn signal generator 17. The latter stator has a resistor 39 connected thereacross engageable by a slidable contact 40, for varying the output signal of the stator, the contact connecting by way of a lead 41 with one end of stator 21 of turn rate signal device 22, the latter stator having a resistor 42 arranged thereacross likewise engageable by a slidable contact 43 which connects by way of a lead 44 with a slidable contact 45 of a resistor 46 located within the amplifier.

Resistor 46 and slidable contact 45 constitute an adjustable potentiometer for varying the signal of follow-up device 19, one end of the resistor connecting by way of a lead 47 with one end of stator 26, the opposite end of the stator connecting with the opposite end of the resistor by way of a lead 48. A lead 49 tapped to lead 48 connects with grid 27 of the amplifier input to feed directly thereto the signal of the follow-up device and the other signals of the series connected signal chain.

It will now be apparent to those skilled in the art that with the novel arrangement hereinabove described, follow-up signal will be available for motor control to the last in spite of grounds that may occur along the signal chain whereby the possibility for undesirable oscillatory surface control has been, for all practical purposes, eliminated.

In actual installation of automatic pilot systems in aircraft the follow-up signal generators are located with the surface controlling servomotors which are spaced a considerable distance from the amplifier so that opens may occur in the wiring between the follow-up signal generators and the amplifier. Means have been heretofore provided to detect such opens in the form of a bias voltage automatically applied to grid 27 to thereby make the channel or channels containing the open lead or leads inoperative. A battery 50 constitutes the source of protective grid bias and has its positive side grounded as shown and the negative side thereof connected through a relatively high value resistor 51 with the grid. The overall resistance of the series signal circuit is small as compared with the resistance value of resistor 51 so that during normal operation of the automatic pilot the protective bias of the battery is effectively shorted out by the low resistance of the signal circuit because the grid will possess a ground through the signal circuit. In the event that an open lead is developed along the signal chain, the ground connection is effectively lost so that the shorting effect of the low resistance signal circuit is eliminated and the entire bias signal is applied to the grid to block the amplifier. While the system above described generally performed as intended, it was found that in the event of an open lead occuring between the amplifier and the follow-up device the shorting effect of the low resistance signal circuit was retained for the reason that grid 27 would still retain a ground connection through lead 49, resistor 46, contact 45 and lead 44 through the remaining signal generators. In this manner loss of follow-up due to the open lead between the amplifier and the follow-up device was by-passed and the protective bias was not applied to the grid as it should have been for proper monitoring operation.

In accordance with a further object of the novel arrangement of the present invention, therefore, the latter disadvantage has been overcome so that any open lead occurring between the amplifier and the follow-up device is sensed and as a result thereof the protective bias of battery 50 is applied automatically to the grid of the amplifier input to block the latter from operating the servomotor. To this end, therefore, two electrolytic condensers 52 and 53 are arranged in series with resistor 46 and in opposed relation to each other so that the positive side of condenser 52 is connected with resistor 46 and the negative side thereof is connected with the negative side of condenser 53. The condensers being of low impedance offer no significant resistance to the passage of the alternating current follow-up signal passing therethrough during normal operation of the automatic pilot but do block the passage of direct current therethrough. For the foregoing reason when an open does occur between the amplifier and the follow-up device such an occurrence will be detected immediately, because the D. C. ground return through leads 49, resistor 46, contact 45 and lead 44 through the signal generators other than the follow-up device is blocked by the condensers and the grid must seek a return through the follow-up device. In this manner the open lead between the amplifier and the follow-up device is encountered and the short for the protective bias is thus removed so that the latter is applied to the grid to block operation of the amplifier.

It will now be readily apparent to those skilled in the art that a novel safety arrangement has been provided for monitoring the operation of positioning systems such as aircraft automatic pilots so that improper operation of such systems due to grounds or open leads occurring in the signal chains has been eliminated.

Although but one embodiment of the invention has been illustrated and described in detail, it is to be expressly understood that the invention is not limited thereto. Various changes can be made in the design and arrangement of the parts without departing from the spirit and scope of the invention as the same will now be understood by those skilled in the art.

We claim:

1. A positioning system having a motor for operating a controlled member in response to a control signal, a follow-up device operable by the motor for preventing oscillatory control of the system, an amplifier having an output connected with the motor and an input, at least one control signal developing device for energizing the motor and having a ground connection, and means connecting the signal developing device and the follow-up device in a signal chain with the follow-up device in the lead in the chain and connected with the amplifier input and the signal developing device at the trailing end of the signal chain, said connecting means being subject to an open circuit condition and including a monitoring system for detecting an open circuit condition and blocking said amplifier output.

2. A positioning system having a motor for operating a controlled member in response to a control signal, a follow-up device operable by the motor for preventing oscillatory control of the system, an amplifier having an output connected with the motor and an input, a plurality of control signal developing devices for operating the motor, and means connecting the signal developing devices and the follow-up device in a series signal chain with the motor, said connecting means being subject to open circuit failures and including a monitoring system having means for detecting a failure of said connecting means, and means responsive to said detecting means for blocking the amplifier output.

3. A positioning system having a motor for operating a controlled member in response to a control signal, a follow-up device operable by the motor for preventing oscillatory control of the system, an amplifier having an output connected with the motor and an input, a plurality of control signal developing devices for operating the motor, and means connecting the signal developing devices and the follow-up device in a series signal chain with the follow-up device in the lead in the chain and connected with the amplifier input and one of the signal developing devices having a ground connection and located at the trailing end of the signal chain whereby in the event of a ground developed in the signal chain due to worn or defective wiring resulting in the loss of one or more of the signal developing devices the follow-up device will retain control of the motor, said connecting means between said follow-up device and amplifier including safety means for making said amplifier ineffective in the event of an open connection in the signal chain due to a break in the wiring.

4. An aircraft automatic pilot having a servo motor for operating a craft surface in response to a control signal, follow-up means operable by the motor for preventing oscillation of the aircraft about a reference position, a signal chain comprising an amplifier having an output connected with the motor and an input, said follow-up means being included in said signal chain and located remotely with respect to said amplifier, a protective bias for the amplifier input to block the amplifier in the event of open connections developed in the signal chain due to worn or defective wiring normally shunted through the signal chain to be ineffective on the amplifier input, and means associated with the follow-up means to prevent shunting of the protective bias through a part of the signal chain in the event of an open connection between the amplifier and the follow-up means to thereby make the protective bias effective on said amplifier input.

5. An aircraft automatic pilot having a servo motor for operating a craft surface in response to a control signal, follow-up means operable by the motor for preventing oscillation of the aircraft about a reference position, a signal chain comprising an amplifier having an output connected with the motor and an input, said follow-up means being included in said signal chain and located remotely with respect to said amplifier, a follow-up signal adjustment in the amplifier and connected with the follow-up means, said last-named connection being relatively long and subject to breakage due to worn or defective wiring, a protective bias for the amplifier input to block the amplifier in response to open connections developed in the signal chain normally shunted through the signal chain and the follow-up signal adjustment to be ineffective on the amplifier input, and condenser means associated with said follow-up signal adjustment means to prevent shunting of the protective bias therethrough in the event of an open connection between the amplifier and the follow-up means to thereby make the protective bias effective on said amplifier input.

6. The combination with the input of an amplifier for a positioning system having a protective bias for the input for making the amplifier ineffective, of a control circuit comprising a signal chain which when operating normally effectively shorts the protective bias to render it ineffective on the amplifier input, and safety means associated with the signal chain whereby in the event of an open connection in the circuit the shorting effect thereof is eliminated and the protective bias is applied to the amplifier input.

7. The combination with the input of an amplifier for a positioning system having a protective bias for the input for making the amplifier ineffective, of a control circuit comprising a signal chain which when operating normally effectively shorts the protective bias to render it ineffective on the amplifier input, and condenser means associated with the signal chain whereby in the event of an open connection in the circuit the shorting effect thereof is eliminated and the protective bias is applied to the amplifier input.

8. The combination with the input of an amplifier for a positioning system having a protective bias for the input for making the amplifier ineffective, of a control circuit comprising a signal chain which when operating normally effectively shorts the protective bias to render it ineffective on the amplifier input, and electrolytic condenser means associated with the signal chain whereby in the event of an open connection in the circuit the shorting effect thereof is eliminated and the protective bias is applied to the amplifier input.

9. The combination with the input of an amplifier for a positioning system having a protective bias for the input for making the amplifier ineffective, of a control circuit comprising a signal chain which when operating normally effectively shorts the protective bias to render it ineffective on the amplifier input, a portion of the circuit being so arranged as to provide a short for the protective bias even though an open occurs in the connection of a part of the signal chain, and series opposed connected condensers associated with said circuit whereby in the event of an open connection in said part of said signal chain the shorting effect of the circuit is eliminated and the protective bias is applied to the amplifier input.

10. The combination with the input of an amplifier for a positioning system having a protective bias for the input for making the amplifier ineffective, of a control circuit comprising a signal chain which when operating normally effectively nullifies the protective bias to render it ineffective on the amplifier input, and monitor means associated with the signal chain whereby in the event of an open connection in the circuit the effect thereof on the protective bias is eliminated and the bias is applied to the amplifier input.

11. A positioning system having a motor for positioning a controlled member in response to a control signal, a controlling member for developing a control signal for operating said motor, a follow-up device operable by said motor for developing a follow-up control signal for preventing oscillation of the system, and means for connecting said controlling member and said follow-up device in a signal chain with the follow-up device connected to said motor in the lead in the signal chain and said controlling member located at the trailing end of the signal chain, said connecting means being subject to failure by short-circuit or open-circuit condition and including safety means for operating said motor from said follow-up device when a short-circuit condition occurs in the signal chain and for blocking said motor from receiving control signals when an open-circuit condition occurs.

References Cited in the file of this patent

UNITED STATES PATENTS

| | | |
|---|---|---|
| 2,318,061 | Dailey | May 4, 1943 |
| 2,416,097 | Hansen, Jr., et al. | Feb. 18, 1947 |
| 2,464,629 | Young | Mar. 15, 1949 |
| 2,515,349 | Kutzler et al. | July 18, 1950 |
| 2,643,359 | Shenk et al. | June 23, 1953 |